United States Patent [19]
Stickler

[11] 3,917,497
[45] Nov. 4, 1975

[54] METHOD AND APPARATUS FOR FORMING TWO INTERFITTING PREFORMED PARTS BY HEAT FUSION OF SAID PARTS

[76] Inventor: Charles F. Stickler, 57455 Poppy Road, South Bend, Ind. 46619

[22] Filed: July 20, 1973

[21] Appl. No.: 381,254

[52] U.S. Cl. .............. 156/73.5; 29/470.3; 156/294; 156/423; 156/580; 228/2; 264/68; 285/21; 285/423; 425/392
[51] Int. Cl. ... B29c 27/08; F16i 47/02; B23k 29/00; B28b 21/22; B30b 3/00
[58] Field of Search ............ 156/73, 580, 294, 423; 264/68; 425/392; 29/470.3; 228/2; 285/21, 423

[56] References Cited
UNITED STATES PATENTS

| 2,169,315 | 8/1939 | Yngve .................................. 156/73 |
| 2,933,428 | 4/1960 | Mueller ................................ 156/73 |
| 2,942,748 | 6/1960 | Anderson ......................... 156/73 X |
| 3,446,688 | 5/1969 | Flax .................................. 156/73 X |
| 3,562,078 | 2/1971 | Zumstein ........................... 156/73 X |

Primary Examiner—Philip Dier
Attorney, Agent, or Firm—Oltsch & Knoblock

[57] ABSTRACT

A configured thermoplastic product is formed of two interfitting preformed parts which are bonded into an integral unit by heat fusion of the interfitting surface portions of the parts. The apparatus for forming the product includes means to grip one part to restrain rotation thereof and means for gripping and rotating the other part at high speed while the parts are relatively advanced axially as determined by guide means. The method utilizes the apparatus to telescopically interengage parts having an interference fit so as to generate by friction between the parts as the parts advance toward selected interfitting relation heat at the interfitting surface portions of the parts sufficient to soften and fuse said parts at said interfitting surface portions.

12 Claims, 10 Drawing Figures

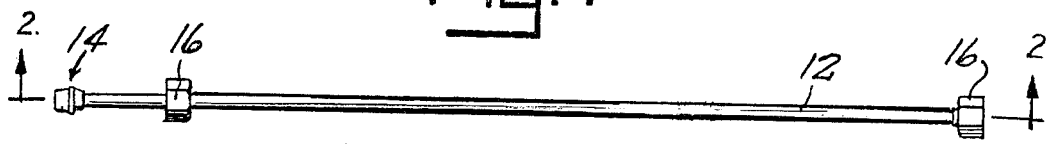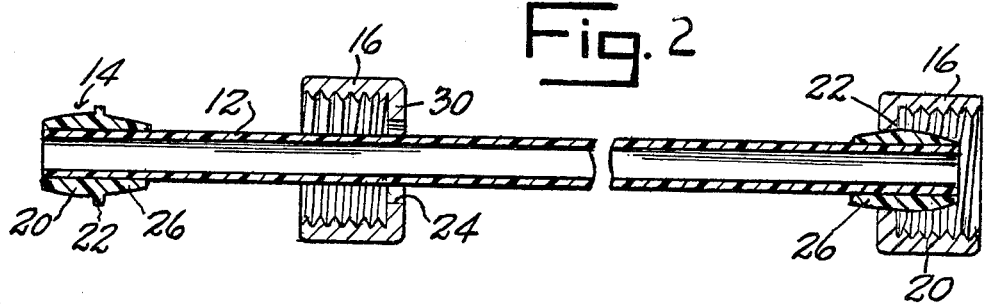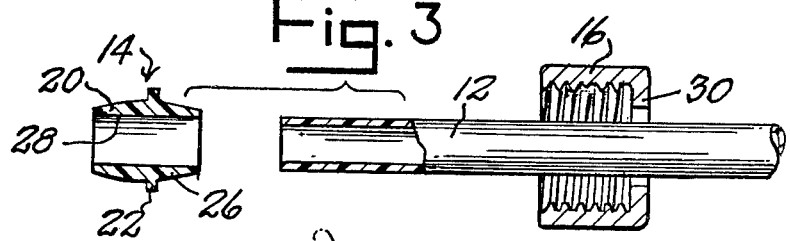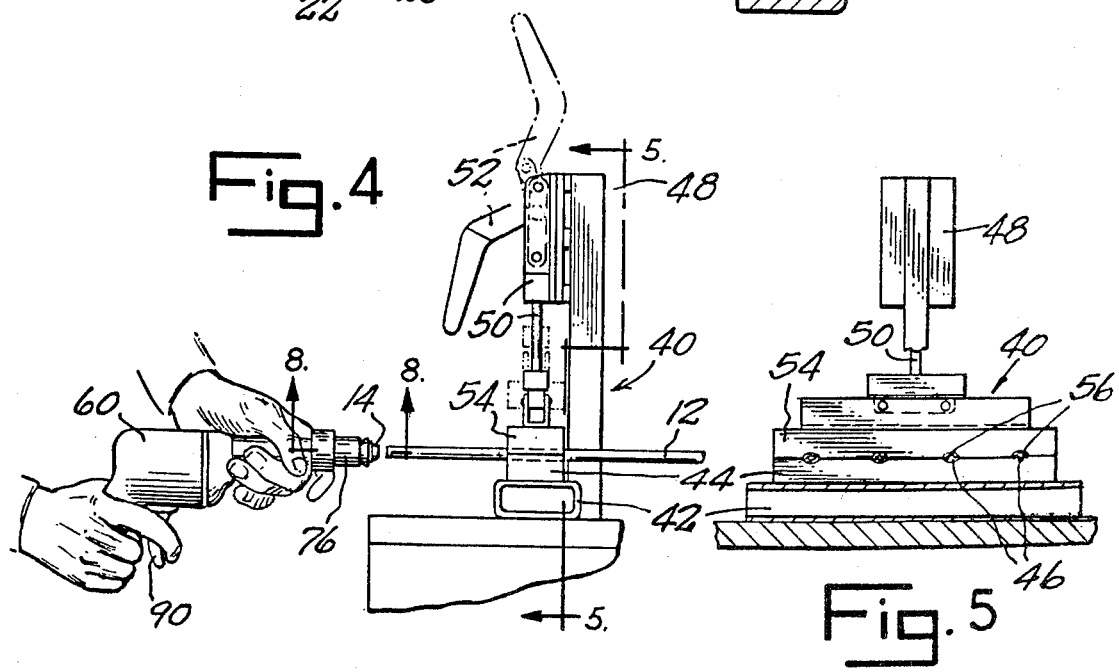

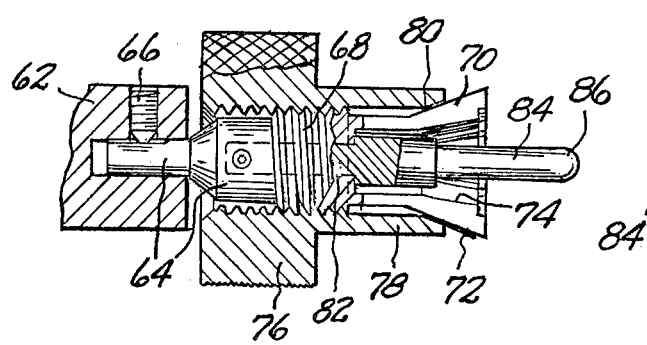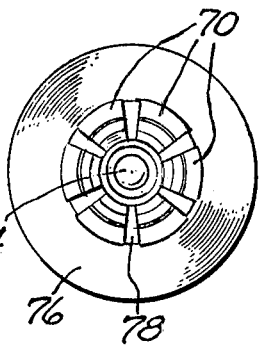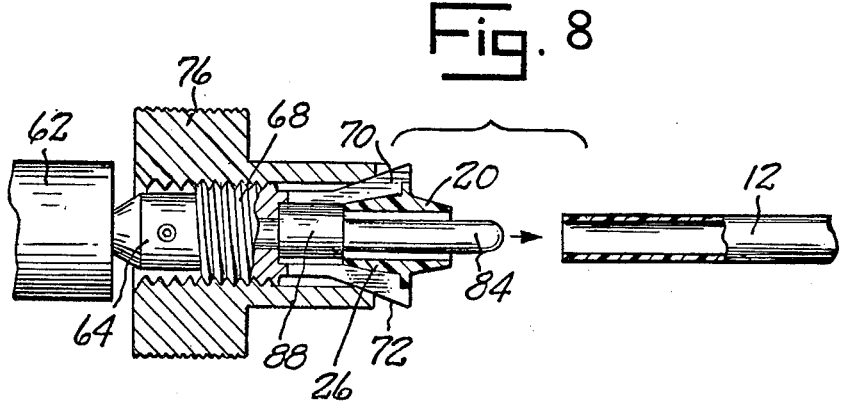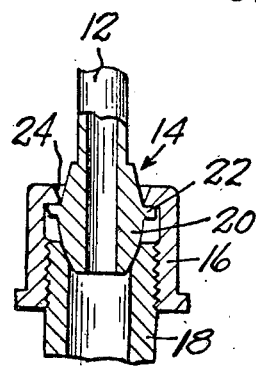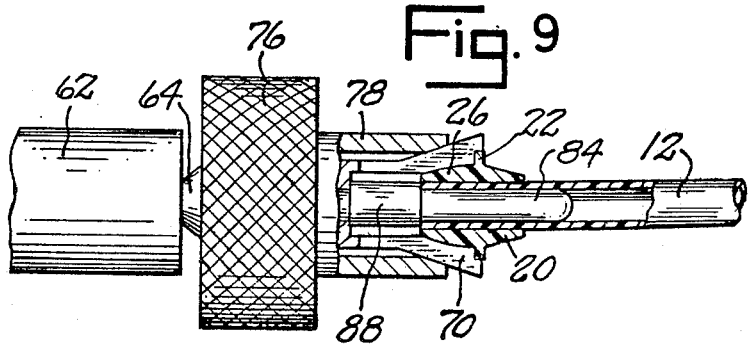

METHOD AND APPARATUS FOR FORMING TWO INTERFITTING PREFORMED PARTS BY HEAT FUSION OF SAID PARTS

This invention relates to a configured plastic product and method and apparatus for making the same. The invention is particularly concerned with the joining of two preformed thermoplastic parts or components to produce a configured unit in which the parts are quickly, effectively and permanently bonded.

The invention finds particular utility in the manufacture of plumbing supply and test conduits wherein the conduit is formed of an extruded thermoplastic material and has bonded thereto at one or both ends an annular thermoplastic member or grommet adapted to cooperate with a plumbing fitting or fixture to provide a liquid-tight compression type joint.

The product of this invention finds particular utility for the plumbing systems of mobile homes and recreational vehicles, such as travel trailers, motor homes and campers. Such vehicles are subject to vibration and shock incident to road travel, with the result that metal plumbing lines and fittings and connections of conventional character used in such vehicles are subject to leaks and other failures incident to movement of the mobile home or recreational vehicle from place to place.

Thermoplastic tubing has been available for both hot and cold water plumbing lines which is of sufficient flexibility to accommodate vibration during travel without failure or leaking, but problems have been encountered in attempts to use such plastic tubing. Thus, compression type fittings require configured end portions to be provided on plastic tubes, that tubes with enlarged ends be available in different lengths, or that multiple parts be assembled with the plastic tube at each joint. The expense of fabricating such tubes and of assembling such parts and the difficulty of fusing preformed plastic parts to plastic tubing have been factors which have retarded the prior use of plastic tubing for plumbing fixtures. Thus, where compression fittings are required, it is necessary to provide a configured enlarged end portion for each end of a tube and heretofore this has made it necessary to cement an end portion to a preformed tube of selected length. The use of cements, solvents, or other bonding materials is time-consuming, and the bond achieved may be subject to leakage.

The present invention provides a plastic plumbing tube with enlarged end portions to cooperate with fittings to provide compression type sealed joints which can be constructed economically and without the use of cement or a bonding agent, and by means of which connection with plumbing fixtures and joints can be effected rapidly and with minimum expenditure of labor at the point of installation.

The primary object of the invention is to provide a configured plastic part which is formed of two preformed plastic members which are assembled together to provide a permanent integral bond therebetween.

A further object is to provide a preformed thermoplastic tubular member with an enlarged diameter end portion in the nature of a preformed thermoplastic ring which is bonded to the tube incident to application thereof to the tube.

A further object is to provide a plumbing unit consisting of a preformed plastic tube having permanently bonded thereto a double conical ring adapted to be secured to a fitting or fixture by a slip nut which is slidable on the tube and adapted to urge the ring into abutting sealed connection with the fixture or fitting.

A further object is to provide a thermoplastic tube with a thermoplastic end portion bonded thereto without the use of a solvent or a pipe joint compound or other sealant, and adapted to be urged into sealed engagement with a fitting or fixture by a screw threaded member.

A further object is to provide a novel, simple and inexpensive method of bonding together two thermoplastic members without requiring the use of a solvent, cement or other adhesive or bonding material.

A further object is to provide a method wherein two preformed thermoplastic members of dimensions to provide an interference fit are joined together by rapidly spinning one member and advancing one member relative to and into telescopic interfitting relation to another member which is restrained from rotation so as to frictionally heat the contacting interfitting surface portions of the members to an extent causing the assembled members to be bonded incident to the assembly thereof and upon cessation of relative rotation thereof.

A further object is to provide apparatus for bonding together two thermoplastic parts rapidly and easily without requiring the use of a solvent, cement or other adhesive or bonding material.

Other objects will be apparent from the following specification.

In the drawings:

FIG. 1 is a side view of a section of hose with configured ends of a type useful to provide a compression type joint.

FIG. 2 is an enlarged longitudinal sectional view taken on line 2—2 of FIG. 1.

FIG. 3 is an exploded view illustrating the component parts for providing a product as illustrated in FIGS. 1 and 2.

FIG. 4 is a side elevational view of apparatus used to assemble and bond preformed plastic parts by my new method.

FIG. 5 is a view taken on line 5—5 of FIG. 4.

FIG. 6 is an axial sectional view of a chuck usable in the practice of my new method.

FIG. 7 is an end view of the chuck as viewed from the right in FIG. 6.

FIG. 8 is a sectional view taken on line 8—8 of FIG. 4 and illustrating a step in the practice of my new method.

FIG. 9 is a view shown partly in axial section illustrating the use of an apparatus to complete my new method.

FIG. 10 is an axial sectional view of a plumbing joint provided by the product embodying this invention.

Referring to the drawings which illustrate one embodiment of the invention, and particularly to FIG. 10 which illustrates a plumbing joint formed by the product of this invention, the numeral 12 designates a thermoplastic conduit having an enlarged portion 14 at an end thereof or preferably at both ends as illustrated in FIG. 2. A pair of oppositely facing slip nuts 16 encircle the tube 12 and each engages an enlarged end 14 thereof to urge the same into sealing abutment with a fitting or conduit 18 upon which the slip nut is screw threaded. Each enlarged end portion 14 includes a tapered part 20 at its outer end and an intermediate circumferential rib 22.

The component parts of the product 12, 14, 16 are illustrated in section in FIGS. 2 and 3. The tube 12 is preformed and is cut to any selected length. Such tubing is usually extruded and may be formed from any thermoplastic material suitable for plumbing purposes, that is, which is adapted to accommodate flow therein of both cold and hot water in the temperature range up to or slightly above 180°F normally existing in a domestic or other plumbing system. I have found that tubing of this character may be formed from polybutylene, polyethylene, polyvinylchloride, and other materials, such as polyolefins. The enlarged end portions 14 of the product are preferably formed or molded as rings or collars of thermoplastic material, preferably the same material as the tube. Each ring or collar part 14 has a tapered end portion 20, an intermediate enlarged circumferential rib 22, and an opposite tapered end portion 26. Each ring or collar part 14 has a bore 28 of a diameter slightly less than the normal outer diameter of the tube 12 to which it is to be bonded so as to provide for an interference fit between part 14 and the tube 12. Each slip nut 16 has an opening 24 in its end wall 30 which is of a diameter to fit with clearance upon the conduit 12 and preferably to at least partially slide over the tapered end 26 or to engage the intermediate circumferential rib 22 of collar part 14. The slip nut may be formed of metal or of any suitable material, such as Celcon produced by Celanese Corporation of America, an ethylcellulose thermoplastic.

In the assembly and fabrication of the product, a section of thermoplastic tube or conduit 12 is cut to selected length. Two slip nuts 16 are applied to the tube section with their end walls 30 innermost. Ring or collar parts 14 are then applied to the opposite ends of the tube. The operation of applying the end members to the tube entails clamping the tube near the end thereof to restrain it from rotation, rotating the member 14, and then advancing one of the members 12, 14 toward the other coaxially to selected telescopic interfitting engagement. Member 14 is rotated at high speed, that is, at a speed high enough to create friction sufficient to heat and soften the outer surface portion of the tube 12 and the inner surface portion of the member 14. I have found that rotation at a speed in the order of 2,000 r.p.m. to 2,500 r.p.m. will suffice to accommodate rapid advance of part 14 onto the tube where the interference fit of the parts is of an order wherein the bore of the member 14 is from 0.002 inches to 0.008 inches less than the outer diameter of the tube 12. Rotation of member 14 at lesser speeds, such as 1,850 r.p.m., has been found insufficient in most cases to produce the friction necessary to permit advance of member 14 onto the tube, and instead may cause the member 14 to advance only partially and then to freeze upon the tube before the member 14 is fully applied, that is, before the member 14 fits fully around the end of the tube. Rotation of the member 14 is stopped as soon as part 14 completely encircles the end of the tube, and the completed product is then released from the assembly apparatus. The tube 12 and member 14 bond into an integral unit when rotation of the member 14 ceases. This bond is continuous throughout the mating surfaces of the interfitting tub 12 and member 14 and the bonded assembly is the equivalent of an integral molded product as a result of the cooling of the friction heated portions of the mating parts 12–14.

One type of apparatus for the practice of the method is illustrated in FIGS. 4–9 inclusive. This apparatus includes means 40 for clamping one or more tubes 12 adjacent to but spaced from the end thereof to which the member 14 is to be applied. As here illustrated, this mechanism comprises a base 42 supporting a lower clamping bar or jaw 44 having one or more tube-receiving grooves 46 formed in its upper face, said grooves preferably being slightly wider than the diameter of a tube and of a depth slightly less than one-half the diameter of a tube 12. An upright 48 carried by base 42 mounts a vertically slidable member 50, here shown as actuated by handle 52 pivoted to upright 48 and to a toggle link or the like pivoted to member 50. An upper clamping bar or jaw 54 is carried by member 50 and has its lower face provided with tube-receiving grooves 56 complementary to grooves 46 and each adapted to cooperate with a groove 46 to firmly grip a tube 12 in fixed position where the upper jaw is lowered to closed position, as illustrated in FIG. 5. It will be understood, of course, that the mechanism for opening and closing the clamping jaws is optional, and that power actuated means may be provided if desired instead of manually operated means.

The apparatus also includes means 60 for rotating the ring or collar portions 14, which means are here illustrated as a hand-held power driven tool 60 having a drive shaft 62 which mounts a chuck or collet unit. It will be understood, however, that the tool need not be hand held and that it may be constructed to hold the chuck at a stationary position or to advance and retract the chuck between selected positions. As here shown in FIGS. 6–9, the chuck comprises a shank 64 adapted to be removably secured to a drive shaft 62, as in an axial bore thereof, and anchored in place by a set screw 66 or other means. Intermediate its ends, the shank 64 has an enlarged screw threaded portion 68. The outer end of the shank terminates in a circumferential set of arcuate integral clamping jaws 70. Each jaw 70 has a tapered outer surface 72 and an inner configuration 74 complementary to and adapted to receive a grip portion 26 of member 14 and also preferably receiving at least a part of the circumferential rib 22 of member 14. A nut 76 is screw threaded on enlarged part 68 of shank 64 and includes a tubular projecting protion 78 encircling the small diameter ends of the clamping jaws 72 and having an inner conical surface 80 at its end adapted to engage intermediate parts of the jaws 70 and to urge the jaws 70 inwardly radially as the nut 76 is advanced toward the jaws 70, thereby firmly gripping member 14 as illustrated in FIGS. 8 and 9. Shank 64 is preferably provided with an axial socket at its outer end communicating with the space between the jaws 70. This socket fixedly mounts the shank 82 of a guide or plot pin 84 which extends coaxially of jaws 70, has clearance within the jaws 70 and projects beyond said jaws. Pin 84 preferably terminates in a rounded end 86. An intermediate portion 88 of the pilot pin located within the innermost parts of the clamping jaws 70 and having clearance therein is provided upon the pilot pin 84 and provides an abutment engaged by the inner end of a ring member 14. The outermost part of the pilot pin is preferably of substantially uniform diameter slightly less than the diameter of the bore of tube 12 so as to have a clearance fit therein and to guide movement of the parts to ensure axial travel of the ring member 14 gripped by the jaws 70 toward and upon the end of the tube 12. The power driven tool 60 has suitable control switch 90.

It will be understood that the use of a hand-held power tool provided with a part gripping chuck is optional, and that any type of mechanism for this service correlated or assembled with a tube gripping part may be employed, so that the rotating ring 14 may be advanced toward a stationary tube 12 or a non-rotative tube may be advanced toward a rotating ring 14, if desired.

In the use of the apparatus here shown, one or a group of tubes 12 is clamped by clamping mechanism 40 to present the end of each tube in selected clearance position to which the part-holding chuck of a power driven spinning tool is accessible, or vice versa. The part 14 is inserted in the chuck of the spinning tool and clamped in place by closing the jaws 70 of the chuck thereon. The tool chuck is then rotated at a speed preferably in the order of 2,000 r.p.m. to 2,500 r.p.m. Simultaneously one of the part 14 and tube 12 is advanced in an axial direction toward the other, as by advancing the tool-carried part 14 toward tube 12 as illustrated in FIG. 8. As the parts approach interfitting relation the pilot pin 84 enters the open end of a tube 12. Then the portion 20 of the rotating ring part 14 which projects beyond the clamping jaws 70 of the chuck engages the end of the non-rotating tube 12 telescopically with an interference fit causing friction which generates heat to soften and melt the contacting portions of the tube 12 and the ring part 14 as the relative axial movement of ring 14 and tube continues. As here illustrated, endwise movement of the tool and the part 14 rotated thereby toward and relative to tube 12 continues until the end of the tube 12 abuts the intermediate enlarged stop part 88 of the pilot pin. Thereupon the rotation of the chuck of tool 60 is stopped and the nut 76 of the tool is withdrawn to release and permit expansion of the chuck jaws 70 and disengagement of the jaws from the ring member 14. Upon release of the jaws 70, the pilot pin of the tool can be withdrawn endwise clear of the assembled parts 12, 14 which become bonded in the desired position illustrated at the left in FIG. 2 incident to the cessation of rotation of part 14 and to cooling and setting of the previously friction heated portions of tube 12 and member 14.

The operation of applying the ring member 14 to desired bonded position on tube 12 requires only a very short interval of time, such as a few seconds following clamping of the ring part 14 in the chuck. Thus, the method can be performed economically and rapidly without requiring the use of cements or bonding agents and with assurance of fully sealed cohesion of the interfitting parts 12 and 14 to render effective a plumbing connection of the character illustrated in FIG. 10 between the conduit 12 and a tube or fitting 18 by threading of slip nut 16 on the fitting or part 18.

The use of thermoplastic tube or conduit 12 characterized by flexibility and by its property of accommodating both hot and cold water makes the product useful when preformed in selected standard lengths, as distinguished from the requirement that metal conduits be preformed to exact length and exact shape or configuration. The flexibility of the tube or conduit 12 permits it to assume various shapes to accommodate connection of plumbing parts spaced apart various distances and confined within a limited space, such as the space between inner and outer walls or between the floor and subfloor in a mobile home, recreational vehicle or other installation. Also, the flexibility of the conduit permits it to assume a shape to accommodate for deviations from axial alignment between the plumbing parts to which the opposite ends of the conduit are to be connected without requiring bending the conduit to precise shape as is necessary where copper tubing is used. Another advantage of the unit is that the wedged fit of the thermoplastic part 20 of the conduit 12 within the end of a fitting 18 and its yielding nature provides an effective seal upon advance of nut 16, so that a seal can be provided by hand rotation of nut 16 without the use of a wrench or other nut advancing tool.

A typical plumbing supply or test conduit usable in mobile homes, recreational vehicles and other installations, such as prefabricated homes or buildings, and also usable in other installations, includes a plastic tube 12 of selected length which has enlarged end or ring portions 14 bonded on the ends thereof and on which tube two oppositely facing slip nuts 16 are slidable, said nuts 16 being retained by the enlarged tube end portions 14. The preformed assembly is employed to provide a compression type sealed joint or connection with another conduit, a fitting or other member to which the tube 12 is to be connected, as illustrated in FIG. 10. The enlarged end portion 14 of the tube has an outer tapered part 20 which is adapted to project into the end of the conduit or fitting 18. The intermediate section 22 of the enlarged end portion 14 preferably defines a circumferential flange or rib of a diameter greater than the inner diameter of the bore 24 at the inner end of the slip nut 16. The slip nut 16 is screw threaded upon the part or fitting 18 to which tube 12 is to be connected, and abuts the enlarged intermediate section 22, as at the circumferential rib, so as to wedge the enlarged tube part 14 endwise within and against the member or fitting 18 and thus provide an effective continuous circumferential seal at the joint between the tube 12 and fitting 18.

While the preferred embodiment of the product and the apparatus and the preferred steps for the method of manufacture have been illustrated and described, it will be understood that changes may be made within the scope of the appended claims without departing from the spirit of the invention.

What I claim is:

1. The method of making a configured thermoplastic product from two preformed thermoplastic components having respectively an outer surface of substantially uniform circular cross sectional shape and diameter and a bore of substantially uniform circular cross sectional shape and of a diameter to receive said first named component with an interference fit comprising the steps of:

gripping one of said components to restrain it against rotation, rotating the other component, advancing one of said components toward the other to selected coaxial telescopic relation therewith while said rotating component rotates at a speed sufficient to generate friction and heat to soften the full extent of the interfitting surface portions of said components, and stopping rotation of said rotating component when said selected telescopic relation is reached to accommodate cooling and bonding of said friction heated interfitting surface portions of said components throughout the full extent thereof.

2. The method defined in claim 1, wherein said rotating component is rotated at a speed of at least 2000 revolutions per minute.

3. The method defined in claim 1 wherein the interfitting surfaces of said components are cylindrical and the diameter of said bore is slightly less than the outer diameter of the component inserted into said bore.

4. The method defined in claim 3, wherein the diameter of said bore is at least 0.002 inches less than the outer diameter of the component inserted into said bore.

5. The method defined in claim 1, wherein the component which is telescopically received in said bore is a tube and receives a cylindrical guide concentric with and projecting axially from said bored component with a clearance fit in advance of the telescopic interfit of said components, rotation of said other component continuing until said advancing component reaches said selected telescopic relation.

6. The method defined in claim 1, in which the telescoped component is a tube and receives a cylindrical pilot member with a clearance fit preceding telescopic engagement of said components while said components are relatively shifted rotatively and axially to selected telescoping relation.

7. Apparatus for making a configured thermoplastic product from two preformed interfitting thermoplastic components including an inner component having an outer surface of uniform outside diameter and an outer component having a bore of uniform inside diameter to receive said inner component with an interference fit, comprising means for releasably gripping one of said components to restrain it against rotation, means for releasably gripping and rotating at high speed said other component, and cylindrical means carried by and projecting from one of said gripping means for guiding relative endwise movement of said components coaxially into telescoping relation.

8. Apparatus as defined in claim 7 wherein said guide means is carried by and projects from said rotatable gripping means.

9. Apparatus for bonding to a thermoplastic preformed tube of uniform outer diameter a preformed thermoplastic ring having a bore of a uniform diameter slightly less than the outer diameter of said tube, comprising means for releasably gripping said tube to restrain it from rotation, and means for rotating said ring at high speed, said last named means including a cylindrical pilot member projecting coaxially from said ring and insertible in said tube with slight clearance to guide relative movement of said tube and ring to telescoping relation and to interiorly support said tube during said relative movement.

10. Apparatus as defined in claim 9, wherein said ring rotating means includes a chuck having a circular set of ring-gripping jaws, means for releasably contracting said jaws to ring gripping position, and wherein said pilot member extends centrally between and includes a cylindrical part projecting beyond the ends of said jaws and terminating in a rounded end, said jaws, ring and pilot member defining an annular chamber to receive the end portion of said tube in telescoped relation within said ring.

11. Apparatus as defined in claim 10 wherein said pilot member includes an enlarged portion positioned within said jaws to define a stop engageable by the end of said tube.

12. Apparatus as defined in claim 9, wherein said ring includes a tapered end portion and said jaws cooperate to define a recess receiving and of a shape complementary to said tapered ring portion.

* * * * *